United States Patent

[11] 3,614,196

| [72] | Inventor | Werner Schlapp<br>Asslar, Germany |
|---|---|---|
| [21] | Appl. No. | 68,374 |
| [22] | Filed | Aug. 31, 1970 |
| [45] | Patented | Oct. 19, 1971 |
| [73] | Assignee | Ernest Leitz GmbH<br>Wetzlar, Germany |
| [32] | Priority | Sept. 12, 1969, May 29, 1970 |
| [33] | | Germany |
| [31] | | P 19 46 284.1 and P 20 26 345.0 |

[54] COMBINED LENS HOOD AND FILTER SUPPORT
6 Claims, 2 Drawing Figs.

[52] U.S. Cl................................................. 350/58,
350/159, 350/318
[51] Int. Cl....................................................... G03b 11/04
[50] Field of Search........................................... 350/58–60,
245, 252–257, 315, 318

[56] References Cited
UNITED STATES PATENTS

| 2,260,991 | 10/1941 | Gorey.......................... | 350/257 |
| 2,496,928 | 2/1950 | Bing et al..................... | 350/252 |
| 2,937,563 | 5/1960 | Ranft et al. .................. | 350/159 |
| 3,549,259 | 12/1970 | Klatchko...................... | 350/159 |

FOREIGN PATENTS

| 19,842 | 11/1891 | Great Britain................ | 350/257 |

Primary Examiner—David Schonberg
Assistant Examiner—Robert L. Sherman
Attorney—Krafft & Wells ABSTRACT: A lens hood adapted to be mounted on the front portion of an objective, to support a filter in front of the objective, to be reversibly mountable on the objective for transporting and having a friction wheel for holding and rotating the filter.

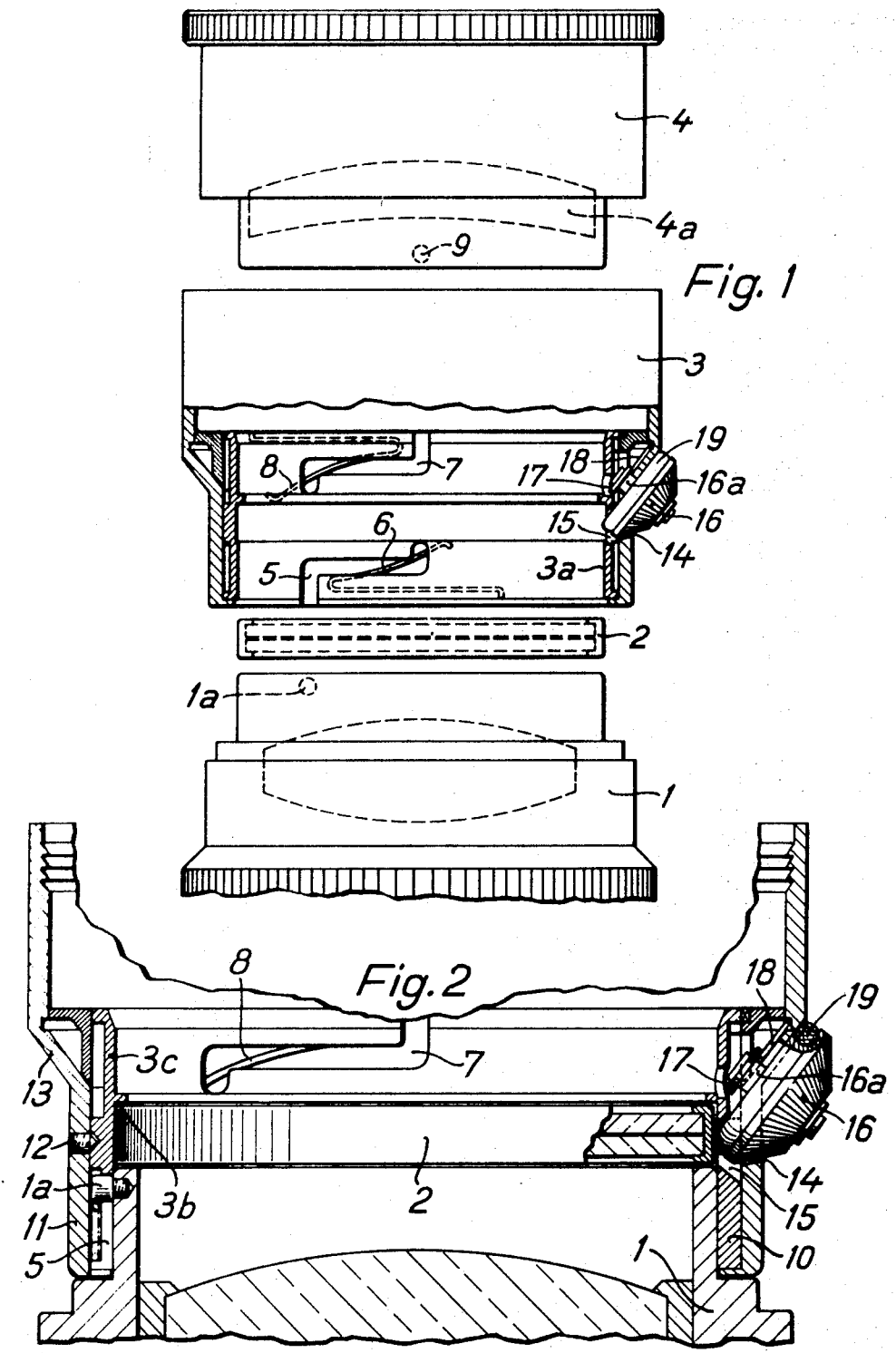

COMBINED LENS HOOD AND FILTER SUPPORT

CROSS-REFERENCES TO RELATED APPLICATIONS

Applicant incorporates by reference the disclosure of application Ser. No. 813,509, filed in the U.S. Pat. Office on Apr. 4, 1969 and having the same inventor as the present application. Application Ser. No. 813,509 has a priority date of April 10, 1969 based upon German application P 19 00 547.1.

BACKGROUND OF THE INVENTION

The field of the invention is optical systems having lenses which are detachably supported and are adapted to contain polarization filters which are relatively adjustable.

The present invention is an improvement over the lens hood disclosed in application Ser. No. 813,509 which discloses a lens hood adapted to be mounted on the front portion of an objective and to support a filter in front of the objective. The lens hood of the prior art includes a tubular rear member having an inner diameter corresponding to the diameter of a series of filters. The tubular rear member is provided with a Z-shaped slot extending in axial and in circumferential direction. This slot is adapted to receive a pin positively secured to and radially projecting from the cylindrical front portion of the objective. A wire spring is fixed to the tubular rear member so as to extend with its resilient end across the Z-shaped slot so that the spring is engaged by the pin when the lens hood is mounted on the objective. An abutment is provided at the front portion inside the tubular member so that the abutment defines a cylindrical space into which the filter can be inserted from the rear prior to mounting the lens hood on the objective.

The lens hood disclosed in application Ser. No. 813,509, has the tubular neck section provided with a perforation, in which a knurled wheel is disposed to be radially displaceable against spring pressure. The knurled wheel is rotatable about an axis parallel to the optical axis and can be shifted by finger pressure from the outside against spring force toward the optical axis so that its external periphery comes into contact with the periphery of the filter inserted in the lens hood. If the knurled wheel is rotated in this position, the filter is entrained in this rotation by the knurled know, or by some other frictional connection.

SUMMARY OF THE INVENTION

The present invention has the purpose of providing an additional improvement of the lens hood disclosed in application Ser. No. 813,509, namely with respect to the filter-rotating device as well as with respect to the additional mounting of supplementary lenses at the lens hood.

The improvement as regards the filter-rotating device is accomplished by providing that the friction wheel is held, by spring force, in its position wherein it is closest to the optical axis, so that when the filter is inserted the wheel is in constant contact with the periphery of the filter. Thus, whereas the knurled wheel, according to application Ser. No. 813,509 normally does not contact the periphery of the filter, but must rather be placed into this contact position by finer pressure against the spring force, the friction wheel according to the present invention is constantly maintained in contact at the periphery of the filter by a spring, whenever a filter is inserted. In contrast thereto, if no filter is inserted, the spring presses the friction wheel into its inner position, from which it can be displaced toward the outside by finger pressure.

The construction and arrangement of the friction wheel, in this connection, is particularly advantageous when it is disposed inclined with respect to the optical axis, i.e., when its axis of rotation intersects the optical axis approximately, and when it is provided with a wide inclined surface which can be conveniently engaged by a finger to apply pressure thereto.

The special advantage of the friction wheel arranged according to the present invention resides in that the friction wheel holds the inserted filter in a clamped position. Whereas heretofore care had to be taken that the filter did not fall out when the lens hood was detached from the objective, this disadvantage has now been eliminated by the clamping effect of the friction wheel. In addition thereto, the previous purpose of the knurled wheel is still fulfilled, namely to rotate an inserted polarization filter when the wheel proper is turned.

With respect to the improvement of mounting supplementary lenses in the lens hood, this is accomplished by providing that the inner cylinder, beyond the abutment, has the same diameter corresponding to the front rim of the objective mount and is likewise provided at this place with at least one curved radial slot extending in the axial direction as well as in the circumferential direction, so that the lens hood can be attached to the objective in the reverse direction. Furthermore, in the functional position of the lens hood, additional optical components, the mounts of which are equipped with at least one correspondingly disposed pin, can be snapped into the lens hood from the object side.

Accordingly, by the above-disclosed design of the lens hood in the area from its inner abutment toward the object, two advantages over the prior art are achieved. During nonuse of the camera, especially for transporting same in a carrying case, the user is now able to attach the lens hood to the objective in the reversed position, and lock the lens hood in this position. In contrast thereto, in the position of use of the lens hood, the front radial slot serves, for example, for holding a supplementary lens in the lens hood. For this purpose, the mount of the supplementary lens or some other optical component must have the same external diameter as the mount of the objective proper, and besides, must likewise have the radial pin provided on the objective mount. The locking of the supplementary lens in the lens hood is carried out in exactly the same manner as the locking of the lens hood to the objective by a brief rotating motion, at the end of which a spring disposed at the slot presses the pin into an extension of the slot extending in the axial direction. In order to release the connection, the mount must be somewhat lifted against the pressure of the spring, and then it is rotated in the opposite direction.

BRIEF DESCRIPTION OF THE DRAWING

In the drawing, the invention is schematically illustrated in one embodiment wherein:

FIG. 1 shows a total view of the lens hood, together with a series filter lens and a supplementary lens; and FIG. 2 shows an enlarged representation of the friction wheel with a series filter lens inserted therein.

DESCRIPTION OF THE PREFERRED EMBODIMENTS

FIG. 1 shows in an exploded view, an objective mount 1, a series filter lens 2, a lens hood 3, as well as a supplementary lens or lens attachment 4a with a mount 4.

The lens hood 3 is provided with the tubular neck section 3a equipped with an inner abutment 3b. In a conventional manner, the filter lens 2 is inserted in the neck section and against the inner abutment. Furthermore, the neck section is additionally provided with a radial Z-slot 5 extending in the axial direction and in the circumferential direction, and a wire spring 6 cooperating with this slot.

The objective mount 1 has a pin 1a, which engages the slot 5 when the lens hood is attached to the mount, so that the lens hood can be locked to the objective with or without interposing the filter.

Beyond the inner abutment 3b, the tubular neck section 3a continues in a section 3c having the same diameter. In the section 3c, there is likewise a radial Z-slot 7, with a wire spring 8. This slot and this spring are disposed in a mirror-image relationship with respect to the Z-slot 5 with the wire spring 6. The Z-slot 7 and the wire spring 8 can thus serve for locking a mount which is inserted in the lens hood from the front, i.e., from the object side.

Such a mount can be, for example, the mount 4 shown in the drawings which, in the present case, contains a supplementary lens 4a. The mount 4 is adapted, with respect to its diameter, to the internal diameter of the tubular neck section, or its component 3c. Besides, the mount 4 carries a pin 9 which engages the slot 7 during the insertion of the mount in the lens hood. The movements required for locking the mount 4 in the lens hood and for releasing same therefrom are the same as are required for locking the lens hood to the objective mount. Furthermore, it can readily be seen from the drawings that the slot 7 with the spring 8 can also serve for inverting the lens hood onto the objective mount 1 in the reverse direction, and for locking the lens hood at that place. This second age of operation is of importance when the lens hood is to be carried attached to the objective while being transported, for example in a carrying case.

From FIG. 2, it can be seen that the lens hood consists of an inner sleeve 10 and an outer sleeve 11. The inner sleeve 10 and the outer sleeve 11 are connected with each other by means of three threaded pins 12. The outer sleeve 11 has a stepped diameter, and the two different cylinders are connected with each other by an inclined surface 13. In this inclined surface 13 and in a portion of the cylindrical surface of the smaller diameter, the outer sleeve 11 is provided with a slot 14. Likewise, the inner sleeve 10 also has a slot 15 at this point. A friction wheel 16 having an external knurled conical shape, a groove in the periphery and a frictional material in the groove, contacts the inclined surface 13 so that the axis of rotation of this wheel intersects the optical axis. The trunnion 16a extends through inclined plane 13 and wheel 16 also extends through the slot 15 of the inner sleeve 10. Beyond the slot 14 through inclined plane 13, the trunnion 16a is provided with a locking washer 17, so that the entire friction wheel may be secured against disengagement.

In the interspace between the outer sleeve 11 and the inner sleeve 10, a hairpin spring 18 is provided which is bent approximately in the radius of the outer sleeve and which rests, with one leg, on the sleeve 11, whereas its other leg contacts the trunnion 16a under washer 17. By means of this spring, the friction wheel 16 is always pressed into its inner position.

Below the conical portion of the wheel 16, a rubber O-ring 19 is pulled over the friction wheel and into the groove. If a filter is inserted in the lens hood, the friction wheel presses, with this O-ring 19, against the outer periphery of the filter mount, so that the filter is held in this position. The filter is also held in position when the lens hood is removed from the objective. Thereby, the disadvantage of previous lens hood construction is avoided, wherein there was the danger that the loosely inserted filter could fall out of the lens hood.

The slot 14 in sleeve 11 conforms to the outer diameter of the conical external shape of the friction wheel on the side near the objective and conforms to the outer diameter of the periphery of the ring 19 on the opposite the objective. The slot 15 in sleeve 10 conforms to the outer periphery of ring 19 with sufficient dimensional tolerance to permit pressure contact between ring 19 and the filter peripheral mount.

In another embodiment, the periphery of the friction wheel which comes into contact with the periphery of the filter is covered with a synthetic material having a high coefficient of friction. This synthetic material is suitably polyvinyl chloride, synthetic rubber or other rubberlike materials.

The friction wheel having a knurled conical external shape can be rotated by finger pressure, the filter being rotatably entrained by friction. Therefore, it is possible in the construction of this invention, for example, to rotate a polarization filter in the inserted condition.

In order to be able to remove the filter from the lens hood, it is sufficient to shift the friction wheel 16 by finger pressure in the slot against the pressure of the spring 18 in the slots toward the outside and in the upward direction. Thereby, the ring 19 is brought out of contact with the periphery of the filter mount, so that, when the lens hood is turned, the filter falls out of the hood. In the same manner, the insertion of the filter can be effected; however, the latter can also be merely pressed into place during the insertion, the friction wheel yielding toward the outside.

I claim:

1. A lens hood adapted to be mounted on the front portion of an objective, to support a filter in front of the objective, to support other optical components in front of the filter and to be reversible on the objective for transporting, said lens hoods comprising in combination;

a tubular rear member having an inner diameter corresponding to the diameter of the cylindrical front portion of said objective and to the standardized diameter of a series of filters;

a first Z-shaped slot on said tubular rear member extending in axial and in circumferential direction, said first slot adapted to receive a first pin positively secured to and radially projecting from said cylindrical front portion of the objective;

first spring means fixed to said tubular rear member so as to extend with its resilient ends across said first slot, said spring means engaged by said first pin when said lens hood is mounted on said objective;

an abutment provided at the front portion inside said tubular rear member wherein the abutment defines a cylindrical space wherein said filter can be inserted;

a tubular front member beyond said abutment having said inner diameter corresponding to the diameter of the cylindrical front portion of said objective and to the standardize diameter of other optical components, said abutment and the inside of the tubular front member defining a cylindrical space wherein said other optical components can be inserted;

a second Z-shaped slot on said tubular front member extending in axial and in circumferential direction, said second slot adapted to receive said pin positively secured to and radially projecting from said cylindrical front portion of the objective for reversing said lens hood for transporting, and said second slot also adapted to receive a second pin positively secured to and radially projecting from an optical mount for said other optical components; and second spring means fixed to said tubular front member so as to extend with its resilient ends across said second slot, said second spring means engaged by said first pin when reversing said lens hood for transporting and said spring means engaged by said second pin for securing said other optical components in the functional position of said lens hood.

2. A lens hood adapted to be mounted on the front portion of an objective, to support a filter in front of the objective, to support other optical components in front of the filter, to be reversible on the objective for transporting and having a friction wheel for holding and rotating the filter, said lens hood comprising in combination;

a tubular rear member having an inner diameter corresponding to the diameter of the cylindrical front portion of said objective and to the standardized diameter of a series of filter;

a first Z-shaped slot on said tubular rear member extending in axial and in circumferential direction, said first slot adapted to receive a first pin positively secured to and radially projecting from said cylindrical front portion of the objective;

first spring means fixed to said tubular rear member so as to extend with its resilient ends across said first slot, said spring means engaged by said first pin when said lens hood is mounted on said objective;

an abutment provided at the front portion inside said tubular rear member wherein the abutment defines a cylindrical space wherein said filter can be inserted, held in position and rotated;

a tubular front member beyond said abutment having said inner diameter corresponding to the diameter of the cylindrical front portion of said objective and to the standardized diameter of other optical components, said abutment and the inside of the tubular front member defining a cylindrical space wherein said other optical components can components can be inserted;

a second Z-shaped slot on said tubular front member extending in axial and in circumferential direction, said second slot adapted to receive said pin positively secured to and radially projecting from said cylindrical front portion of the objective for reversing said lens hood for transporting, and said second slot also adapted to receive a second pin positively secured to and radially projecting from an optical mount for said other optical components;

second spring means fixed to said tubular front member so as to extend with its resilient ends across said second slot, said second spring means engaged by said first pin when reversing said lens hood for transporting and said second spring means engaged by said second pin for securing said other optical components in the functional position of said lens hood;

an aperture extending through said tubular rear member;

said friction wheel adapted for rotation in said aperture and for contact with the periphery of said filter; and third spring means mounted on said lens hood and biasing said friction wheel in the direction of the periphery of said filter for holding said filter in position and for rotating said filter.

2. The lens hood of claim 2, wherein said lens hood has an optical axis and said friction wheel has an axis of rotation inclined to and intersecting said optical axis.

4. The lens hood of claim 3, wherein said friction wheel has a periphery for contacting said periphery of said filter comprising a covering of synthetic material having a high coefficient of friction.

5. The lens hood of claim 4, wherein said covering is a rubber O-ring

6. The lens hood of claim 3, wherein said friction wheel has a wide knurled, conveniently grippable inclined surface.